(12) United States Patent
Herschke et al.

(10) Patent No.: US 8,529,694 B2
(45) Date of Patent: Sep. 10, 2013

(54) POWDERED ACETYLENIC SURFACTANTS AND COMPOSITIONS CONTAINING THEM

(75) Inventors: Laurent Herschke, Utrecht (NL); Roger William Franciscus Reinartz, Dordrecht (NL)

(73) Assignee: Air Products and Chemicals, Inc., Allentown, PA (US)

( * ) Notice: Subject to any disclaimer, the term of this patent is extended or adjusted under 35 U.S.C. 154(b) by 1093 days.

(21) Appl. No.: 11/586,910

(22) Filed: Oct. 26, 2006

(65) Prior Publication Data
US 2008/0102274 A1     May 1, 2008

(51) Int. Cl.
*C04B 24/00*     (2006.01)
(52) U.S. Cl.
USPC ............ 106/823; 428/403; 428/404; 428/407
(58) Field of Classification Search
USPC ...................... 106/823; 428/403, 404, 407
See application file for complete search history.

(56) References Cited

U.S. PATENT DOCUMENTS

| | | | |
|---|---|---|---|
| 2,498,712 | A | 2/1950 | Ryden et al. |
| 2,800,463 | A | 7/1957 | Morrison |
| 3,287,290 | A | 11/1966 | Bray, Jr. |
| 4,741,777 | A | 5/1988 | Williams et al. |
| 4,946,904 | A | 8/1990 | Akimoto et al. |
| 4,948,429 | A | 8/1990 | Arfaei |
| 5,650,543 | A | 7/1997 | Medina |

(Continued)

FOREIGN PATENT DOCUMENTS

| | | |
|---|---|---|
| DE | 30 28 559 A1 | 2/1982 |
| DE | 44 30 362 A1 | 2/1996 |

(Continued)

OTHER PUBLICATIONS

Madoux et al. CAS abstract for US 5,786,127; answer 40 on p. 200-203 of Search report. (Jul. 28, 1998).*

(Continued)

*Primary Examiner* — Paul Marcantoni
(74) *Attorney, Agent, or Firm* — Michael K. Boyer

(57) ABSTRACT

A composition including particles of a carrier having on a surface thereof a compound according to structure (A)

$$\underset{CH_3}{\overset{RO}{\underset{|}{C}}}(CH_2)_m-C\equiv C-\underset{CH_3}{\overset{OR}{\underset{|}{C}}}(CH_2)_m \quad ; \quad A$$

wherein either m is 1 and R is according to structure (B)

$$B$$

in which n is an integer from 3 to 7, or m is 2 and R is according to structure C $$C$$

in which p is an integer from 1 to 10. Such compositions are useful for a variety of applications, for example the preparation of mortars and cements.

28 Claims, 4 Drawing Sheets

(56) References Cited

U.S. PATENT DOCUMENTS

| | | | |
|---|---|---|---|
| 5,786,127 A * | 7/1998 | Madoux et al. | 430/273.1 |
| 5,912,284 A | 6/1999 | Hirata et al. | |
| 5,922,796 A | 7/1999 | Colombet et al. | |
| 5,959,017 A | 9/1999 | Eck et al. | |
| 6,165,968 A | 12/2000 | Lenoble | |
| 6,166,113 A | 12/2000 | Haerzschel et al. | |
| 6,277,190 B1 | 8/2001 | Schulte et al. | |
| 6,369,153 B1 | 4/2002 | Guerin et al. | |
| 6,610,752 B1 | 8/2003 | Schmid et al. | |
| 6,686,330 B2 | 2/2004 | Jordan, IV et al. | |
| 6,717,019 B2 | 4/2004 | Lassila | |
| 2002/0045692 A1 | 4/2002 | Fiedler et al. | |
| 2002/0058601 A1 | 5/2002 | Jordan, IV et al. | |
| 2002/0112651 A1 | 8/2002 | Yu et al. | |
| 2003/0000426 A1 | 1/2003 | Sasage et al. | |
| 2003/0158448 A1 | 8/2003 | Lassila | |
| 2003/0164478 A1 | 9/2003 | Fiedler et al. | |
| 2003/0187100 A1 | 10/2003 | Bury et al. | |
| 2003/0187101 A1 | 10/2003 | Shendy et al. | |
| 2004/0048961 A1 | 3/2004 | Klein et al. | |
| 2004/0259983 A1 | 12/2004 | Okazawa et al. | |
| 2005/0191228 A1 | 9/2005 | Panz et al. | |
| 2005/0239908 A1 | 10/2005 | Creutz et al. | |
| 2006/0194905 A1 * | 8/2006 | Tadych | 524/157 |
| 2008/0009563 A1 | 1/2008 | Leyrer et al. | |
| 2008/0098933 A1 | 5/2008 | Killat | |
| 2008/0102274 A1 | 5/2008 | Herschke et al. | |
| 2009/0192242 A1 | 7/2009 | Willimann et al. | |

FOREIGN PATENT DOCUMENTS

| | | |
|---|---|---|
| DE | 100 61 410 A1 | 9/2001 |
| DE | 10-2006-050336.8 | 9/2007 |
| EP | 0 402 812 A2 | 12/1990 |
| EP | 0 291 073 B1 | 3/1992 |
| EP | 0 516 109 A1 | 12/1992 |
| EP | 0 522 791 A1 | 1/1993 |
| EP | 0 601 518 A1 | 6/1994 |
| EP | 0 731 128 A1 | 9/1996 |
| EP | 0 655 495 B1 | 3/1999 |
| EP | 0 995 473 A1 | 4/2000 |
| EP | 1 010 736 A1 | 6/2000 |
| EP | 0 897 744 B1 | 2/2001 |
| EP | 1 120 384 A1 | 8/2001 |
| EP | 0 687 724 B1 | 9/2001 |
| EP | 0 850 894 B1 | 3/2002 |
| EP | 0 718 018 B1 | 9/2002 |
| EP | 0 807 162 B1 | 4/2003 |
| EP | 1 333 048 A1 | 8/2003 |
| EP | 0 857 189 B1 | 12/2003 |
| EP | 1 426 349 A1 | 6/2004 |
| EP | 1 916 275 B1 | 4/2008 |
| GB | 641 653 A | 8/1950 |
| GB | 974 162 A | 11/1964 |
| GB | 2 083 015 | 3/1982 |
| GB | 2 332 670 A | 6/1999 |
| JP | 03-028147 A | 2/1991 |
| JP | 06-206753 A | 7/1994 |
| JP | 1996-040782 | 2/1996 |
| JP | 2000-178490 A | 6/2000 |
| JP | 2002187754 A | 7/2002 |
| JP | 2003-516301 A | 5/2003 |
| JP | 2003-531096 A | 10/2003 |
| JP | 2004-224833 A1 | 8/2004 |
| JP | 2005-510442 A | 4/2005 |
| JP | 2005-155130 | 6/2005 |
| JP | 2005-330394 A1 | 12/2005 |
| JP | 2006-511418 A | 4/2006 |
| WO | WO 96/23864 | 8/1996 |
| WO | 97/44289 A1 | 11/1997 |
| WO | WO 98/49114 | 11/1998 |
| WO | 01/42162 A1 | 6/2001 |
| WO | 02/31036 A1 | 4/2002 |
| WO | WO 02/46117 A1 | 6/2002 |
| WO | 03/024884 A1 | 3/2003 |
| WO | WO 03/024884 A1 | 3/2003 |
| WO | 03/045869 A1 | 6/2003 |
| WO | 2004/056445 A1 | 7/2004 |
| WO | 2005/121188 A1 | 12/2005 |

OTHER PUBLICATIONS

EP 1010736 abstract (Onishi et al.) Jun. 21, 2000; Answer 37 of 41 on p. 195 of Search report.*
Sofie et al. abstract; answer 35 on p. 190 of Search Report. "Ceramic shape forming by freeeze drying of aqueous and non-aqueous slurries", Sofie et al., Ceramic transactions (2000), 108 (Innovative processing and synthesis of ceramics, glasses, and composites III, p. 235-243.*
DE 19935271 abstract (Friedrich, answer 32 of 41 on p. 179 of Search Report). Feb. 8, 2001.*
WO 2001042162 abstract (Shendy et al.-answer 31 of 41 on p. 176 of Search report). Jun. 14, 2001.*
WO 2001081264 abstract (Yu et al.-answer 30 of 41 on Search Report). Nov. 1, 2001.*
Chemical Abstract Structure Search on p. 33-34 (Just to show compound exists in AB structure form listed as answer 1 of 1. (May 2000).*
US 20060194905 abstract (Tadych-answer 5 of 12 on p. 46) Aug. 31, 2006.*
WO 9909822 abstract (Bean et al.) Answer 8 of 12 of Search report. Jul. 30, 1998.*
"Applications of Acetylenic Diol Ethoxylates"; IP.com Journal, 4(11), 24 (No. IPCOM000032042D); Oct. 20, 2004; ISSN: 1533-0001; XP002469855.
Agenda_WPS_AirProducts; Mar. 2004.
Surfynol®MD20—Brochure; 2003.
Surfynol MD-20 Molecular Defoamer (2003).
Surfynol 104 Surfactant (2001).
Bowen, P.; "Particle Size Distribution Measurement from Millimeteres to Nanometers and from Rods to Platelets"; Journal of Dispersion Science and Technology; vol. 23 No. 5; 2002; pp. 631-662.
"Foam Doesn't Stand a Chance Against Air Products' Newest Surfynol MD-20 Molecular Defoamer Product"; Air Products Press Releases; Nov. 12, 2003; [online]; XP002460299; URL:http//airproducts.com/PressRoom/CompanyNews/Archived/2003/04017.
Galgoci, E.C., et al; "Innovative 1.6-11 Molecular Defoamer Technology"; Air Products and Chemicals [online]; 2004; XP002460300; URL:http://www.airproducst.com/NR/rdonlyresj74166723-C173-4CED-A6CF-C6F29BB89D84/0/InnovativeMolecularDefoamerTechnology.pdf.
Ohama; "Polymer Based Admixtures"; Cement and Concrete Composites 20; 1998; pp. 189-212.
MSDS for Surfynol 440 (Aug. 7, 2011).
Agenda_WPS_AirProducts; Mar. 2004 F.
Sample Request of Various Surfynols, e.g. 104S WPS (Mar. 8, 2004).
Boujenah, S., et al.; "Gemini Surfactants in Cementitious Application"; Mar. 2, 2004.
MSDS for Surfynol 104E (Jun. 22, 2011).
MSDS for Surfynol 2502 (Aug. 23, 2010).
Surfynol® 104—Brochure; 2001.

* cited by examiner

POWDERED ACETYLENIC SURFACTANTS AND COMPOSITIONS CONTAINING THEM

BACKGROUND OF THE INVENTION

Powdered surfactants are used in a variety of industrial and commercial applications. Examples include powder paints and coatings, pigment powder premixes, adhesives, water treatment additives (such as for waste-water and boiler water treatment), agrochemicals, detergents, oilfield applications, metalworking, polymer processing, extrusion molding, aqueous re-dispersible powders, polymer dispersions, paper processing and coatings, textile applications, and foundry coatings. Typical conventional powdered surfactants include either a single component or a blend of one or more of a hydrocarbon oil, a polydimethylsiloxane, a fatty alcohol ethoxylate, a fatty acid ester derivates, a polyglycol, and a polyether. In some cases a particulate carrier such as silica is used as a support for the surfactant component.

Powdered surfactants have been used in a variety of powdered cement building material products, for example dry mixes for preparing grouts, pre-cast concretes, jointing and adhesives compounds, synthetic plasters, and self-leveling mortars. In particular, they have been increasingly used in formulations for making bare finished (i.e., having a bare cementitious surface) cement structures for structural building elements and also as decorative elements for the construction of architectural panels, retaining walls, flooring, tiles, sound barriers, paving, and for self-leveling underlayments. For many of these applications, formulations are desired that, upon mixing with water, provide mixes that have good flow and self-leveling properties, provide a sufficiently long processing window ("open time") to facilitate working the mixture, provide adequate long lasting de-aeration efficiency throughout the initial setting time of the mortar composition, and provide durable and attractive bare concrete surfaces.

The addition of certain other components to cement mixes sometimes results in a variety of undesirable effects which the powdered surfactant may help to overcome. However, conventional powdered surfactants typically suffer from one or more drawbacks in such formulations, and thus there is a need for new free-flowing powdered surfactants having a good combination of properties for use in cements and other applications.

BRIEF SUMMARY OF THE INVENTION

In one aspect, the invention provides a composition including particles of a carrier having on a surface thereof a compound according to structure (A)

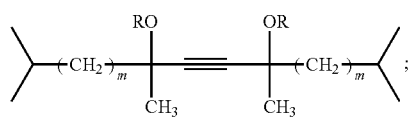

wherein either m is 1 and R is according to structure (B)

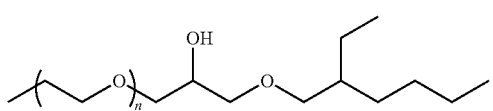

in which n is an integer from 3 to 7, or m is 2 and R is according to structure C

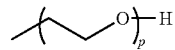

in which p is an integer from 1 to 10.

In another aspect, the invention provides a method of making a cement mixture that includes combining water, a particulate cementitious component, and a composition including particles of a carrier having on a surface thereof a compound according to structure (A)

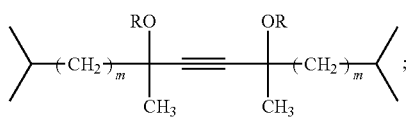

wherein m is 1 and R is according to structure (B)

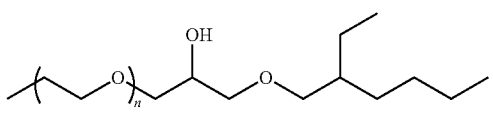

in which n is an integer from 3 to 7.

In yet another aspect, the invention provides a method of making a cement mixture that includes combining water, a particulate cementitious component, and a composition including particles of a carrier having on a surface thereof a compound according to structure (A)

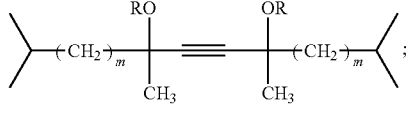

wherein m is 2 and R is according to structure C

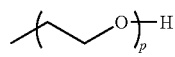

in which p is an integer from 1 to 10.

DETAILED DESCRIPTION OF THE INVENTION

Powdered Surfactant

Figure 1:
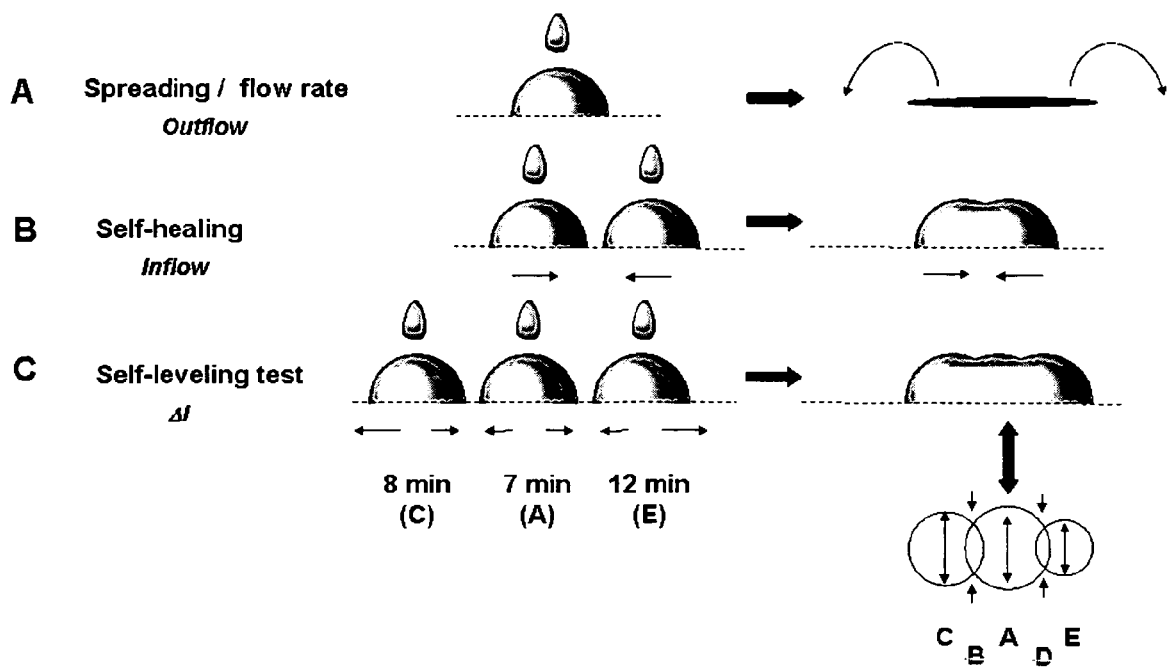
FIG. 1 shows spreading, self-healing, and self-leveling of mortar mixes during testing.

The invention provides powdered surfactants comprising particles of a carrier having on a surface thereof a compound according to structure (A)

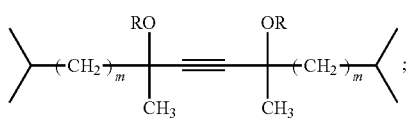

A wherein either m is 1 and R is according to structure (B)

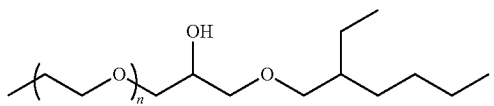

B in which n is an integer from 3 to 7 (typically, n will be from 4 to 6), or m is 2 and R is according to structure C

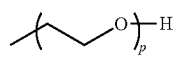

C in which p is an integer from 1 to 10, typically from 4 to 10.

Compounds according to the embodiment in which m is 2 and R is according to structure C are available commercially from Air Products and Chemicals of Allentown, Pa. under the trade name DYNOL™ 604 Surfactant, shown below.

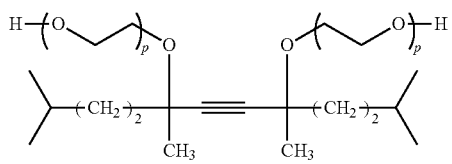

Compounds according to the embodiment where m is 1 and R is according to structure (B) are available from Air Products under the trade name SURFYNOL® MD-20 Molecular Defoamer, shown below.

The carrier may be any particulate material, either organic or inorganic, with silicas and zeolites being typical examples. It is typically an inorganic, amorphous material such as a silica ($SiO_2$) powder. In some embodiments, the carrier is a monodisperse or bidisperse, free flowing, amorphous silica powder with an mean particle size D(1,0.5) from 5 μm to 100 μm, typically from 5 μm to 25 μm, and a volume weight diameter average D(3,4) from 10 μm to 50 μm. Typically, the specific surface area or internal surface area is at least 50 $m^2/g$, more typically at least 100 $m^2/g$, and most typically at least 150 $m^2/g$, as measured by the BET (Brunauer-Emmett-Teller) $N_2$ sorption method. Suitable exemplary silicas include HISIL® 233 precipitated silica, available from PPG Industries, Inc., and SIPERNAT® 22 precipitated silica, available from Degussa.

Other suitable silicas include unformed silicas of elastic to solid consistency with loose to compact pore structures, the silica being present in the form of highly condensed polysilicic acids. Such silicas are amorphous or semi-crystalline, and are capable of adsorbing compounds according to structure (A) so that the outside layer of the material appears substantially dry. In some embodiments, the solid support is porous and, in particular may have medium to high porosity as indicated by its pore volume or its specific surface area. The pores may be in the form of macropores, mesopores and/or micropores. Also suitable are zeolites, for example zeolites of type NaA and NaX.

Inorganic powders such as calcium phosphate, calcium carbonate, polyphosphate, kaolin, chalk, microtalcum, and barium sulfate may also be used as carriers. Colloidal materials such as mineral oxide suspensions (e.g., zinc oxide, aluminium oxide, titanium dioxide) or redispersible polymer dispersion powders containing poly(styrenebutadiene), polyvinyl alcohols, polyvinylpyrrolidones, polyethylenes, polypropylenes, poly(meth)acrylates, polycarboxylates, polyurethanes, cellulose derivatives and starch, may also be used as carriers.

The loading of compound (A) on the carrier may be any weight percent, but typically will be from 10 to 75 wt %, and more typically from 40 wt % to 75 wt %. As shown in the examples, powdered surfactants according to the invention may be prepared by depositing a compound of structure (A) onto a carrier from a suitable solvent.

The powdered surfactant typically contains from 40 to 75 wt % of the compound of structure (A), more typically from 42 wt % to 50 wt %, and most typically from 48 to 50 wt %. Typically it contains from 5 to 10 wt % water. The particle size distribution is monodisperse, bidisperse or polydisperse, and typically presents a median particle size D(1,0.5) between 5 μm and 100 μm, more typically between 5 μm and 25 μm and a volume weight diameter average D(3.4) between 10 μm and 50 μm. D(3.4), the volume weight diameter average, also called the volume-weight moment mean diameter, is defined in P. Bowen, J. Dispers. Sci. Technol. 23(5) (2002) 631. It is

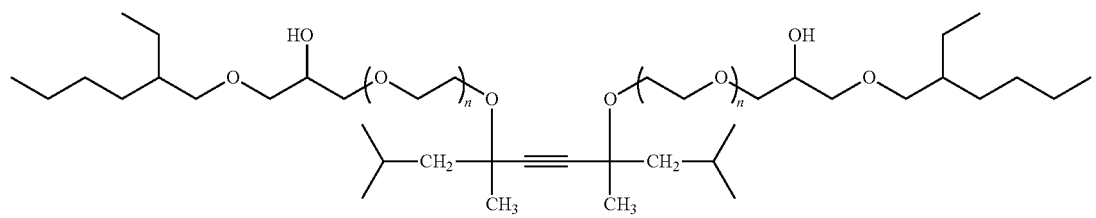

the average diameter stemming from a particle size distribution statistics with a moment z=3.

The powder volume fraction is typically from 0.70 to 1.00, more typically from 0.70 to 0.80, and the powder apparent density is typically from 0.3 to 0.8 g/cm$^3$ and more typically from 0.45 to 0.71 g/cm$^3$.

The powder viscosity of the powdered surfactant is typically from 60 Pa·s to 200 Pa·s at 5 rpm, from 2 Pa·s to 20 Pa·s at 50 rpm, and from 0.5 Pa·s to 5 Pa·s at 200 rpm. More typically, the viscosity is from 68 Pa·s to 169 Pa·s at 5 rpm, from 4.5 Pa·s to 15.5 Pa·s at 50 rpm, and from 500 mPa·s to 2.2 Pa·s at 200 rpm. For example, the viscosity may be about 124 Pa·s at 5 rpm, 11 Pa·s at 50 rpm, and 2000 mPa·s at 200 rpm. The thixotropic index (defined in the Examples section below) may range from 1 to 12, and typically is about 10. The powdered surfactant flow time according to the test method described in the Examples is typically less than 3 seconds, and in some embodiments is less than 1 second. Dust release is typically 4 or 5, according to the method described in the Examples.

Other Ingredients

The powdered surfactants of this invention may be combined with any of a number of other components, which may then be added to mortar drymix or other compositions. Examples of such other ingredients include wetting agents, flow and leveling agents, shrinkage reducing agents, water reducing agents, naphthalene sulfonates, polystyrene sulfonates, phosphates, phosphonates, cross-linked homo- or co-polymers of acrylic acid and salts thereof, calcium-salts of organic acids having 1 to 4 carbon atoms, salts of alkanoic acids, aluminum sulfate, metallic aluminum, bentonite, montmorillonite, sepiolite, polyamide fibers, polypropylene fibers, polyvinyl alcohol, and homo-, co-, or terpolymers based on vinyl acetate, maleic ester, ethylene, styrene, butadiene, vinyl versatate, and acrylic monomers, air entraining agents and/or de-aerating agents, and redispersible dispersion powders such as polyvinyl acetate, polyethylene-polyvinyl acetate, polyvinyl alcohol, and homo-, co-, or terpolymers based on vinyl acetate, maleic esters, ethylene, styrene, butadiene, vinyl versatate, and acrylic monomers. Other possible components include short and long fibers such as steel, glass, carbon, polyolefins (PE, PP), polyester, and polyamide fibers. Rheology modifiers (cellulose containing and polysaccharide additives, including starch, biopolymers such as xanthan gum) and alkali swellable acrylic associative thickeners (containing cellulose and/or meth(acrylic) functionalities) may also be used, as well as fine and/or coarse aggregates and/or fillers such as sands or clays. Other inorganic cement components gypsum, blast furnace slag, fly ash, aluminum sulfate, metallic aluminum, bentonite, montmorillonite, and sepiolite may be included, as well as dyes, pigments and micronized coloring agents. Other functional additives include set accelerators and/or set retarders, water repellents, hydrophobizing agents, corrosion inhibitors, flame retardants, biocides and fungicides.

Cement Compositions Employing the Powdered Surfactant

The powdered surfactant of this invention may be used in any of a variety of cement compositions, by which it is meant compositions that contain particulate cementitious ingredients, i.e., those that will form a hardened hydrated mass upon the addition of water. The cementitious component may comprise any such material known in the art, and may include for example an aluminosilicate or Portland cement (defined as cement CEM I type according to the European EN 197-1 norm. In addition to the eight types of portland cements defined in ASTM C 150 and EN 197-1, a number of special purpose hydraulic cements called "factory-made composite cements" of types: CEM II, CEM III, CEM IV and CEM V according to EN 197-1 norm are suitable. Examples of these include (i) blended hydraulic cements (made by intimately blending two or more types of cementitious material: portland cement, ground granulated blast-furnace slag, fly ash, natural pozzolans, and fumed silica, and (ii) expansive cements (used to make shrinkage-compensating concrete that is used (1) to compensate for volume decrease due to drying shrinkage, (2) to induce tensile stress in reinforcement, and (3) to stabilize long-term dimensions of post-tensioned concrete structures), sulfate-resisting cement (which contain a high content of iron oxide in order to limit the amount of the mineral phase tricalcium aluminate ($C_3A$) and thereby increase its sulfate resistance). Also suitable are geopolymer cements (made from mixtures of water-soluble alkali silicates and aluminosilicate mineral powders such as metakaolin), slag cement (made with ground granulated blast furnace slag), and tricalcium aluminate cements (made primarily from limestone and bauxite).

Generally a drymix mortar composition contains at least a hydraulic cement and an inert mineral filler (limestone), coarse and fine solid aggregates (containing water soluble silicates), a re-dispersible plasticizing agent or water reducing agent and additional ingredients such as (but not limited to) silica fumes, reinforcing fibers (glass or polymer fibers), preservation agents, and hydrophobization agents and water.

In some embodiments, the cement composition is a dry composition, such as a "drymix" composition as known in the art. Such compositions are powdered, pre-mixed compositions that, upon the addition of suitable amounts of water, form a slurry that hardens to form a desired structure.

In some embodiments, cement compositions including the powdered surfactants of this invention are essentially free of certain other additives, for example those that may alter the hydration rate and/or air entrainment characteristics. Such components may include for example ammonium ions, sulfate ions, and polyorganosiloxanes (silicones).

Applications

Powdered surfactants according to the invention may find use in a large number of product applications. Examples include joint fillers, putties, mastics and sealants. Other examples are pastes and plasters (for adhesion enhancement, open time enhancement and surface appearance improvement), leveling and self-leveling compounds, flooring compounds, screeds (e.g., cement and anhydride based), gypsum-based products such as fillers, spackles, and floor screeds, cements (e.g., for cement grinding, cement hydrophobization and cement coatings). Additional applications include terrazzo, shotcrete, grouts, and tile adhesives. Other examples include mortars, especially drymix mortars for masonry, self-leveling underlayment (SLU) and repair mortars for concrete, and any of various types of concrete material, especially self-compacting concretes.

The powdered surfactants of this invention typically provide a combination of wetting and foam control as well as long term stability when included in drymix cement compositions. Use levels necessary to achieve these results are typically low, often less than 0.05 wt % relative to the rest of the dry cement formulation.

The addition of certain components to cement mixes sometimes results in various undesirable effects, which the powdered surfactants of this invention may help to overcome. For example, in making mortars and concretes, typically the less water used, the stronger the mortar or concrete will be. However, reducing the water content tends to impede flow of the wet mixture. To overcome this, a "superplasticizer" may be used to improve flow. One class of superplasticizers includes sulfo-modified melamine-formaldehyde condensates. These include melamine formaldehyde sulfonates (MFS's) and sulfonated melamine-formaldehyde condensates (SMF's). A drawback of such superplasticizers is that, when included in drymix mortar compositions, the initially good plasticity and workability that they provide is not maintained over time once added to the drymix mortar composition (slump loss) and is substantially lost upon storage, e.g., long term storage at high temperature (28 days at 60° C.) of the mortar or concrete drymix composition. A second drawback of sulfo-modified melamine-formaldehyde condensates is their tendency to entrain air bubbles in the concrete during the cement mixing process. Uncontrolled entrainment of air bubbles may adversely affect the mechanical strength and the surface appearance of the resulting drymix mortar or self-compacting concrete structure.

To address these and other issues, powdered surfactants have been used in conjunction with sulfo-modified melamine-formaldehyde condensates in mortars and cements. However, while conventional powdered surfactants facilitate air de-aeration, they tend to detract from the otherwise good flow and self-leveling provided by the sulfo-modified melamine-formaldehyde condensate superplasticizers.

Another class of superplasticizers, polycarboxylate ethers (PCE's), provides many of the same benefits as sulfo-modified melamine-formaldehyde condensates, but drymix compositions containing them typically possess poor long term stability at normal and high temperatures, often resulting in dramatically poorer mortar plasticization and an increase in their already high air entrainment tendency. A further drawback is their limited self-leveling ability. A powdered surfactant such as SURFYNOL® 104S, or a powdered surfactant that is based on mineral oil or silicone chemistry or polyether or polyglycol chemistry, may therefore be used as a "wetting agent" to help overcome these deficiencies. Other superplasticizers whose performance can be improved with powdered surfactants include naphthalene formaldehyde sulfonates, casein, and lignin sulfonates.

However, conventional powdered surfactants typically suffer from one or more drawbacks with respect to making bare finished cement structures as described above. A first drawback of conventional powdered surfactants is their inability to maintain high flowability and self-leveling while providing extended mortar open time.

Further, the air content of self-leveling mortars is typically desired to be below 2 vol %, and optimally about 1 vol %. Conventional powdered surfactants may be used to de-aerate the mix to achieve this level of air entrainment, but they typically are unable to provide this at a relatively uniform rate over the initial setting time period at their recommended use level of 0.15 wt % to drymix weight. A typical result of this may be adverse effects on the mortar rheology and the surface appearance.

Without wishing to be bound by any particular theory or explanation, it is believed that a fresh mortar composition can be viewed as a mixture of two components: a gaseous air phase and a fluid mortar phase. Air is naturally present in the mortar composition due to its presence at the surface of solid particles as well as its incorporation during the mixing of the composition, and superplasticizer molecules stabilize this air in the form of bubbles in a fresh mortar composition. The addition of conventional powdered surfactants reduces the air content, freeing superplasticizer molecules which then adsorb in larger numbers to the particle surfaces (cement or aggregates) and thereby lubricate the fluid mortar more efficiently. This results in a visco-plastic behaviour (Bingham type fluid). However, the rate of foam release is not well controlled and becomes overly rapid (perhaps due to operation of the surfactant by an incompatibility mechanism, rather than a molecular defoaming mechanism) and a result is the appearance of large bubbles at the air/mortar interface surface of the self-leveling mortar. This creates surface defects.

Use of conventional powdered surfactants at levels below 0.15 wt % typically leads to a mortar air content higher than the targeted 2 vol % and results in the formation of pinholes, non-spherical bugholes and irregular air cavities larger than 1 mm. These reduce the surface quality, weatherability, freeze/thaw crack resistance, chemical staining resistance and maximum compressive strength of the mortar. However, increasing the use level of conventional powdered surfactants above 0.15 wt % to overcome these problems often leads to air content values significantly below 1 vol %, resulting in a drastic loss of the mortar workability and plasticity while improving the mortar dry density and compressive strength. (A 1 vol %±0.1 vol % air content is desired to provide self-leveling mortars having good freeze-thaw cracking resistance while also maintaining good mechanical compressive strength.) Thus, conventional powdered surfactants typically cannot deliver both a 1 vol % air content and a mortar surface of highest quality and durability.

In contrast, the powdered surfactants of the present invention typically have a long lasting de-aeration capacity, i.e., they maintain a relatively constant de-aeration rate until the fluid mortar becomes too viscous and hardens. This minimizes the formation of air bubbles and pinholes at the surface, thereby affording a surface of higher quality while minimizing or even eliminating the need for expensive surface correction or reparation, and increases the durability of the surface.

Drymix compositions containing conventional powdered surfactants typically have limited storage stability (often less than 6 months), have marginal self-healing or self-leveling performance, and produce structures having marginal surface quality. Moreover, many conventional powdered surfactants tend to be dusty, and they often lose their free flowing ability and their performance attributes upon storage (28 days at 23° C. or 50° C.) and over the drymix processing period, i.e., the period that begins with the addition of water and ends with setting (typically between 5 min and 4 hours.) As will be seen in the following examples, the powdered surfactants of this invention show excellent performance with respect to many of the desired properties described above.

EXAMPLES

Preparation of Powdered Surfactants

Method 1

In a 2 L double neck glass balloon, 500 g of SURFYNOL® MD20 was dissolved in 500 mL tetrahydrofuran under inert gas atmosphere ($N_2$) and intensive cooling and mechanical stirred at 500 rpm for 5 min. Then 500 g of silica gel was added slowly over 10 minutes and stirred for 1 hour in order to create a homogeneous suspension. In order to remove the solvent, the mixture was then transferred to an evaporation flask and put on a rotary evaporator with an oil bath at 60° C. at 170 mbar and 150 rpm rotating speed for 2 hours. Traces of tetrahydrofuran were removed by allowing the caked material to dry overnight at 50° C. in a laboratory oven. The resulting finely powdered material was then transferred into a 1.5 L polypropylene bottle to protect it from air moisture.

Preparation of Powdered Surfactants

Method 2

In an 1.8 L Mettler HP60 double mantled stainless steel reactor with paravisc (reverse helix) impeller, 300 g silica powder (HISIL® 233) was slowly introduced under inert gas atmosphere (1 atm, $N_2$) with an agitation of 300 rpm with a B-shaped blade. Then, 300 g SURFYNOL® MD20 was added dropwise over 30 min. The mixture was then stirred for 30 minutes at 20° C. Finally the fine powder was recovered and stored in a 1.5 L polypropylene bottle to protect it from atmospheric moisture adsorption.

Powdered Surfactant Physical Property Characterization

The surfactant adsorption efficiency was analyzed either by weight loss at 475° C. in a laboratory oven for approximately 2 hours, or by determination of the oil adsorption index. The silica carrier moisture content was determined by overnight oven drying at 11° C.

Particle size distribution was evaluated with a Malvern Mastersizer 2000 Light Scattering Device with a Scirocco dry Powder attachment.

The apparent density of the powdered surfactant was measured by weighing in triplicate 100 $cm^3$ of the powered powdered surfactant.

The powder volume fraction was determined by placing 100 $cm^3$ of powdered surfactant onto a TESTING brand vibration table (available from Bluhm+Feuerherdt GmbH, Berlin, Germany) for 5 minutes at 50 Hz with a vibration amplitude of 1.6 mm. The variation between apparent density and compacted density provides the powder volume fraction.

The free-flowability and powder viscosity of the products were characterized by probing 100 $cm^3$ of powder with a Helipath Spindle B on a Brookfield viscometer at 5 rpm and at 50 rpm, and with a Sheen 480 viscometer at 200 rpm. Thixotropic index was calculated as the ratio of viscosities at 5 rpm and 50 pm.

Dust release was assessed as follows. A 50 g sample of powdered surfactant in a sealed 100 mL DURAN® glass laboratory bottle with polypropylene screw cap was inverted 5 times over a period of 30 seconds, and then allowed to rest for 1 minute. Dust release was given a subjective value from 1=poor (much dust) to 5=excellent (very little dust).

The free-flowability was evaluated by determination of the flow time in seconds of 80 $cm^3$ of powdered material flowing from a DIN flow cup of 27 mm aperture at 40 cm height.

Drymix Mortar Performance Testing—General Procedures

Assessment of powdered surfactant performance employed a freshly prepared 1625 g sample of mortar, made by combining 1350 g of mortar drymix such as Floor 4150 or Floor 4310 (available from Maxit Deutschland GmbH of Breisach, Germany) with 270 g of de-ionized water and a selected amount of the powdered surfactant and vigorously mixing for 30 seconds at 180 rpm and 150 seconds at 285 rpm in a Hobart mixer equipped with a B-shaped blade. The 0 minutes reference time was the time at which the water was added.

FIG. 1 illustrates the methodology used to assess spreading, self-healing, and self-leveling of mortar mixes. The leveling performance was directly evaluated with respect to flow diameters (outflow) and joint lengths (inflow) of the spread mortar (refer to the Joint Length scale below), as well as an overall visual evaluation. Lengths B and D (joint lengths) provide a measure of the self-healing capability of a given mortar system. The difference between lengths B and D, referred to herein as Δl, provides an indication of self-leveling performance. A Δl value of 0 indicates the best possible performance, i.e., the joint lengths are the same. For Δl values greater than zero, the following may be used.

Δl>1.5 cm indicates poor self-leveling.
Δl from 0.9 to 1.5 cm indicates fair self-leveling.
Δl<0.9 cm indicates good self-leveling.
Δl<0.2 cm indicates excellent self-leveling.

Typically the outflow was measured by a spreading test (FIG. 1A) in which fluid mortar was poured into a large flow ring (diameter=6.8 cm, height=3.5 cm, volume=127 $cm^3$) resting on a glass plate immediately after the elapsed mixing time (2.25 min). The mortar was allowed to settle and harden for 7.75 min, and then the flow ring was removed to allow the hardening mortar to spread. The outflow was expressed as the mean diameter of a given mortar disk (average of four diameters, spaced 45° apart) after 13 minutes of hardening. Measurement accuracy was ±1 mm.

In the self-healing test (FIG. 1B), two test rings of diameter 5 cm and height 2.2 cm were placed in a line at a 12.5 cm distance of each other. The rings were filled with mortar at 2 minutes after mortar preparation and lifted at different times: 2.5 minutes and 10 minutes. After 12 minutes the inflow and the two outflows were measured. Depending on the mortar open time, and typically after 12 minutes or 13 minutes, the diameter of the two hardening mortar disks was evaluated. The average outflows at 2 minutes and 10 minutes hardening time were evaluated by measuring the diameter in the four bisectrices (perpendicular) directions. Then the interpenetration front between the two mortar disks was measured, thereby defining the mortar joint length or inflow. Measurement accuracy was ±1 mm.

The self-leveling test (FIG. 1C) gives an indication how well the product dries out, levels out and self-heals. The self-leveling test also gives an indication on the tendency of separation, air discharge as well as other leveling properties. In the self-leveling test (Air Products self-leveling test, refer to FIG. 1), three test cylinders (diameter 2.5 cm, height 5 cm) were placed in a line at a 10 cm distance of each other. The rings were filled with mortar at 6.5, 7.5 and 11.5 minutes after mortar preparation and lifted at different times: 7, 8, and 12 minutes. After 18 minutes the joint lengths or inflow (B, D) and the outflow (A, C, E) were measured. Measurement accuracy was $d_{avg}$±1 mm.

Open time was measured as follows. A freshly prepared mortar was spread on a glass table, and a cut was made all the way through with a knife. Using mortar that remained on the knife blade as a result of the cutting process, three mortar droplets were applied to the surface of the mortar. The open time was defined as the time at which the droplets no longer bonded to the bulk hardening mortar without causing permanent surface defects.

The volumetric air content was determined by pressure method according to ASTM C185-9, C231, DIN 18555-2 and EN 1015-7 norms on 850 g freshly prepared mortar with an air-entrainment meter. Air content was measured at 13 minutes (time corresponding to the large flow ring maximum spreading, refer to §2.1). Measurement accuracy was then evaluated at $A_{avg}$±0.1 vol %.

Any distortion to the mortar disk's circular shape, its surface topology (surface roughness) and texture were monitored as well. One of two types of evaluation was used:

(a) If a subjective 1-5 scale was used, then 5 was attributed to the best looking surface appearance ranking and 1 resembling the poorest appearance (or comparable to RHOXIMAT DF 770 DD). Surface defects taken into account for assessment of the surface quality and surface appearance were: (i) surface roughness, (ii) cracks, (iii) white spots, (iV) pinholes, (V) density change rings and halos.

(b) Alternatively, if $d_{ws}$ and $d_p$ values (expressed in number per square centimeter) were reported, these were obtained by counting the number of white spots and pinholes respectively on the hardened mortar disks.

The long term stability of powdered surfactants was assessed by storing 500 g of drymix mortar (the same drymix mortar composition as used for the flow tests) containing 0.1 wt % of the powdered surfactant in a laboratory oven for 28 days at 20° C., 40° C. at 60° C. at a 65% relative humidity, and then measuring changes in performance parameters such as flow, self-leveling, open time, air content, and mortar surface appearance.

Commercial products referred to in the Examples are listed below, with an identification of their source.

RHOXIMAT® DF 770 DD, available from Rhodia PPMC, Paris, France

SURFYNOL® 104S Surfactant, available from Air Products and Chemicals, Allentown, Pa. This product is a powdered surfactant incorporating SURFYNOL® 104 surfactant, whose structure is shown below, on a silica support.

FOAMASTER® PD 01, available from Cognis Corp., Cincinnati, Ohio

In the following examples, a suffix "S" after the name of a surfactant, e.g. MD20S, refers to the indicated surfactant molecule supported on a silica carrier.

Example 1

Free-Flow Ability and Dust Release of Powdered Surfactants

Table 1 shows the compositions and the flow and dusting characteristics of powdered surfactants of the invention (those labeled MD20 and D604) compared with conventional powdered surfactants. The values were all averages of three measurements. The data indicate that the powdered surfactants of the invention exhibited excellent flow times (less than 3 seconds) and very good dust release (at least 3.5, and as high as 5). In particular, DYNOL™ 604 adsorbed on SIPERNAT® 22 (batch 2) and SURFYNOL® MD20 adsorbed on HISIL® 233 had excellent free-flowing behavior compared with SURFYNOL® 104 on silica or FOAMASTER PD01, as well as reduced dust release (values of 3.5-5) compared with AGITAN P823 or SILIPUR RE 2971.

TABLE 1

| Composition | | Loading | Free | Dust |
|---|---|---|---|---|
| Active substance/carrier | Generic chemistry of active substances | On Carrier [wt/wt] | flow [sec][1] | release 1-5 scale[2] |
| MD20/Sipernat 22 | ethoxylated acetylenic diol | 50/50 | 2.5 | 5 |
| D604/Sipernat 22 batch 2 | ethoxylated acetylenic diol | 50/50 | 2 | 5 |
| S104S | acetylenic diol | 42.5/57.5 | 12 | 3 |
| MD20/HiSil 233 | ethoxylated acetylenic diol | 50/50 | 2.5 | 3.5 |
| D604/HiSil 233 | ethoxylated acetylenic diol | 50/50 | 1.5 | 3.5 |
| D604/Sipernat 22 | ethoxylated acetylenic diol | 65/35 | 1.5 | 5 |
| DC 2-4248S | polydimethylsiloxane | 50/50 | 1.5 | 4 |
| Rhoximat 770 DD | blend of aliphatic hydrocarbon oil, ester, and polyether or polyglycol functionality | 57/43 | 3 | 4 |
| Foamaster PD 01 | trade secret blend | 65/35 | 20 | 4 |
| Silipur RE 2971 | polyglycol | — | 25 | 1 |
| Agitan P803 | blend of liquid hydrocarbons and polyglycols | 70/30 | 20 | 3 |
| Agitan P804 | polysiloxane | 66/34 | 6 | 2 |
| Agitan P823 | blend of liquid hydrocarbons and polyglycols | 51/49 | 2.5 | 2 |

[1]Flow cup method: <3 sec. = excellent, >10 sec. = poor
[2]dust release scale: 5 = good, 1 = poor

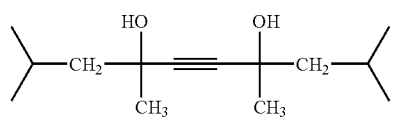 [SMILES: CC(C)CC(C)(O)C#CC(C)(O)CC(C)C]

SURFYNOL® MD-20 Molecular Defoamer, available from Air Products and Chemicals, Allentown, Pa.

DYNOL™ 604 Surfactant, available from Air Products and Chemicals, Allentown, Pa.

SILIPUR® RE 2971, available from Aqualon, Hercules Incorporated, Rijswijk, The Netherlands HISIL® 233 precipitated silica, available from PPG Industries, Inc.

SIPERNAT® 22 precipitated silica, available from Degussa AG.

DC 2-4248S Powdered Antifoam, available from Dow Corning Corp., Midland, Mich.

AGITAN® P803, P804, AND P823 available from Muenzig Chemie GmbH, Germany

Example 2

Simultaneous Outflow and Self-Leveling Enhancement in a Melamine-Formaldehyde Based SLU Drymix Mortar Table 2 shows the results of self-leveling drymix mortar tests using a powdered surfactant of the present invention (MD20S) compared with a conventional powdered surfactant (S104S) and a blank (no surfactant). Significant increases in the outflow range, inflow range and self-leveling performance were found with the inventive powdered surfactant compared with mortar without powdered surfactant and compared with a conventional powdered surfactant S104S, at a low (0.2:1) water to drymix ratio. The "Blank" run used S104S at a 0.1 wt % level to improve wetting, the "S104S" run used S104S at a 0.2 wt % level, and the "MD20S batch 1" run used 0.1 wt % of that surfactant plus 0.1 wt % of S104S.

TABLE 2

| | Test | | | | | | |
|---|---|---|---|---|---|---|---|
| | Self leveling test | | | | | | Flow test |
| | Property | | | | | | |
| | Inflow | | self leveling | Outflow | | | Outflow |
| | | | Parameter | | | | |
| | B [cm] | D [cm] | ΔI [cm] | C [cm] | A [cm] | E [cm] | avg [cm] |
| | | | | Hardening time | | | |
| | 18 min | 18 min | 18 min | 7 min | 8 min | 12 min | 10 min |
| Blank | 6.6 | 6.4 | 0.2 | 11.0 | 11.0 | 11.0 | 23 |
| S104S | 6.9 | 6.8 | 0.1 | 11.4 | 11.3 | 11.2 | 22.0 |
| MD20S batch 1 | 7.5 | 7.5 | 0 | 11.5 | 11.8 | 11.8 | 24.2 |

Table 2 shows an improvement of the outflow of 2.2 cm and an enhancement of the inflow of 0.6 cm when MD20S was used, compared with a drymix containing a conventional powdered surfactant (S104S). Further, it illustrates the excellent self-leveling capability of MD20S (ΔI=0) compared with S104S, even in cases where the outflow was increased by 0.5 cm or more. (See self-leveling outflow values A, C and E in Table 2.)

Example 3

Improvement of Long Term Stability, Outflow and Surface Appearance of an Aluminosilicate MFS-Based SLU Drymix Mortar Containing a Wetting Agent Table 3 summarizes the performance benefits, an improved outflow, a reduced dependence of the outflow rate from the hardening time and a higher surface quality (limited segregation, roughness, cracks, bubbles), provided by powdered surfactants of the invention upon long term storage (28 days) at high temperature of a fast-setting aluminosilicate MFS-based drymix mortar for self-leveling underlayment. Results for conventional powdered surfactants are also shown. All of the runs in Table 3 included a small amount of S104S to improve wetting. The powdered surfactants listed in Table 3 were all used at a 0.1 wt % level. (Thus, the total level of S104S for the runs labeled "S104S" was somewhat more than 0.1 wt %.)

TABLE 3

| MFS-based Drymix mortar | PERFORMANCE | | | |
|---|---|---|---|---|
| | Outflow [cm] | | Surface appearance (5: best- 1: poor) | Storage conditions (time, temperature) |
| Powdered surfactant | 2 min | 10 min | | |
| None (blank) | 14.5 | 13.1 | 1.4 | 1 day, 23° C. |
| S104S | 14.5 | 13.1 | 1.4 | 1 day, 23° C. |
| Rhoximat DF 770DD | 15.5 | 15.0 | 2.85 | 1 day, 23° C. |
| Silipur RE 2971 | 15.2 | 14.3 | 3.6 | 1 day, 23° C. |
| MD20S (HiSil 233) | 15.5 | 15.0 | 4.3 | 1 day, 23° C. |
| D604S (HiSil 233) | 16.3 | 15.6 | 3.6 | 1 day, 23° C. |
| D604S (Sipernat 22) | 16.2 | 15.7 | 3.6 | 1 day, 23° C. |
| None (blank) | 14.2 | 13.9 | 1.4 | 28 days, 23° C. |
| S104S | 14.2 | 13.9 | 1.4 | 28 days, 23° C. |
| Rhoximat DF 770DD | 15.5 | 15.1 | 2.85 | 28 days, 23° C. |
| Silipur RE 2971 | 15.2 | 14.4 | 2.85 | 28 days, 23° C. |
| MD20S (HiSil 233) | 15.7 | 15.7 | 3.9 | 28 days, 23° C. |
| D604S (HiSil 233) | 15.7 | 15.7 | 3.5 | 28 days, 23° C. |
| D604S (Sipernat 22) | 15.8 | 15.3 | 3.6 | 28 days, 23° C. |
| None (blank) | 14.1 | 13.4 | 1.4 | 28 days, 60° C. |
| S104S | 14.1 | 13.4 | 1.4 | 28 days, 60° C. |
| Rhoximat DF 770DD | 13.8 | 13.5 | 2.9 | 28 days, 60° C. |
| Silipur RE 2971 | 14.8 | 14.1 | 3.6 | 28 days, 60° C. |
| MD20S (HiSil 233) | 15.3 | 14.5 | 5 | 28 days, 60° C. |
| D604S (HiSil 233) | 14.9 | 14.9 | 3.6 | 28 days, 60° C. |
| D604S (Sipernat 22) | 15.5 | 14.9 | 3.9 | 28 days, 60° C. |

As seen in Table 3, the inventive powdered surfactants provided enhanced long term stability (28 days, 20-60° C.). Generally, at 28 days storage at 20-60° C., drymix mortars containing 0.1 wt % conventional powdered surfactant showed a deterioration in efficacy with respect to outflow and surface quality. At that same loading of 0.1 wt %, the powdered surfactants of this invention did not suffer significant loss of efficacy upon 28 days storage at 20-60° C. of a drymix mortar. For instance, storage at 60° C., MD20S (HiSil 233) maintained an outflow of 15.3 cm and 14.5 cm after 2 min and 10 minutes hydration time respectively, while Surfynol 104S or RHOXIMAT DF 770 DD displayed a reduced outflow of 13.8 cm after 2 minutes hydration time, actually less than the 14.1 cm value obtained with the blank.

Figure 2:
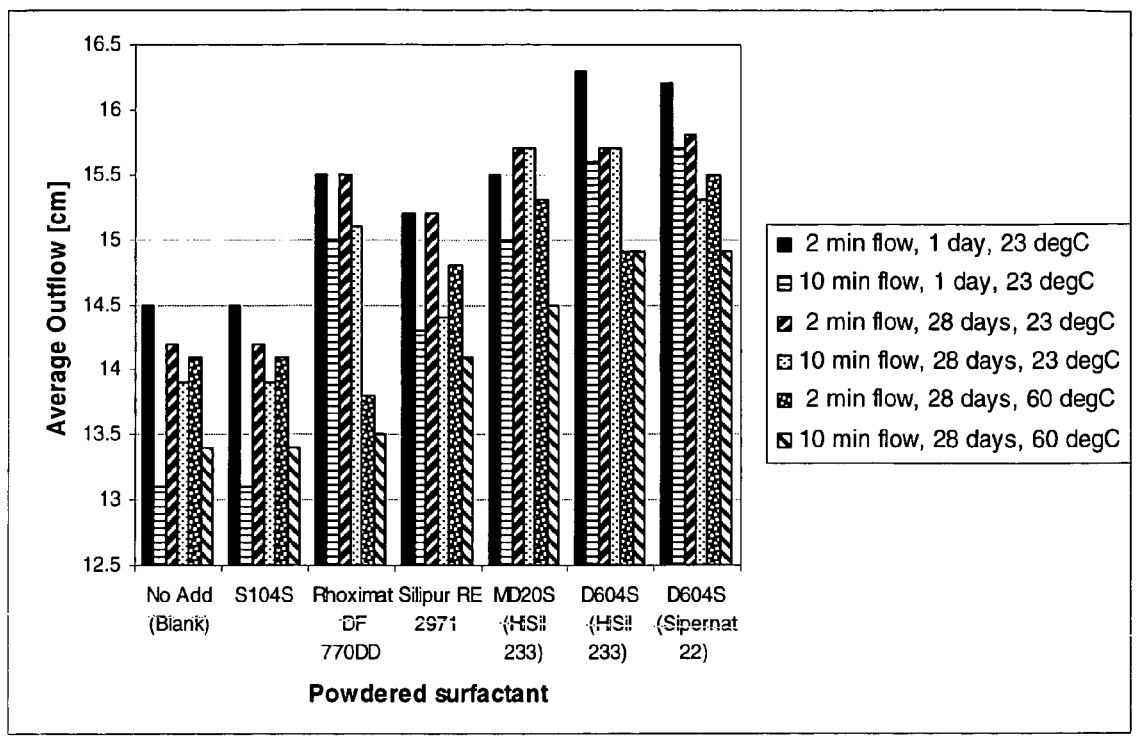
FIG. 2 shows the influence of storage time and temperature on the flow of aluminosilicate MFS-based drymix mortars containing inventive and conventional powdered surfactants.
Figure 3:
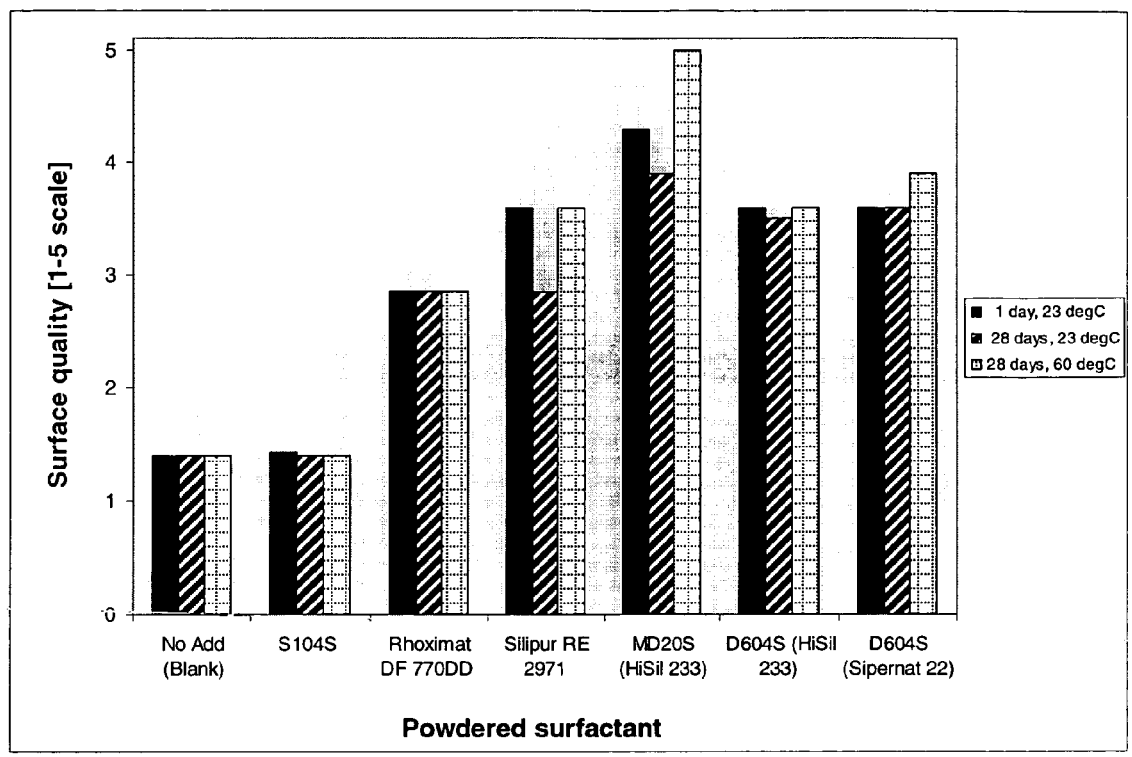
FIG. 3 is a chart illustrating the influence of storage time and temperature on the surface quality of hardened aluminosilicate MFS-based drymix mortars obtained with inventive and conventional powdered surfactants.

Data from Table 3 are plotted in FIGS. 2 and 3, which depict the enhancement of flow and improvement of surface quality provided by surfactants of the invention (MD20S and the two D604S samples, having the compositions shown in Table 1) in comparison with conventional surfactants under the effect of a long storage time (28 days) and temperature modulation (23° C., 60° C.). FIG. 2 shows the influence of storage time and temperature on the outflow of aluminosilicate MFS-based drymix mortars containing inventive and conventional powdered surfactants. FIG. 3 is a chart illustrating the influence of storage time and temperature on the surface quality of hardened aluminosilicate MFS-based drymix mortars obtained with inventive and conventional powdered surfactants.

Figure 4:
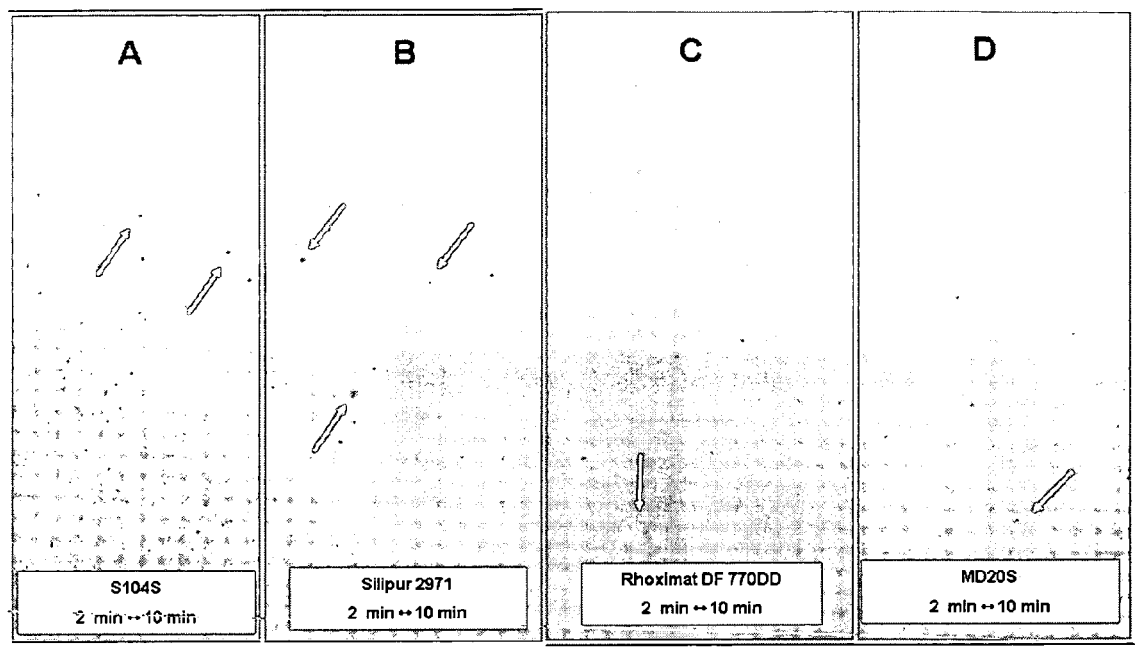
FIG. 4 shows photographs illustrating the surface quality of aluminosilicate MFS-based drymix mortars obtained with inventive and conventional powdered surfactants.

FIG. 4 shows photographs illustrating the improvement of surface quality of an aluminosilicate MFS-based drymix mortar provided by a powdered surfactant of this invention (MD20S, which is MD20 on HISIL® 233) in comparison with conventional materials after 2 min. and 10 min. bulk hardening. The white arrows indicate defects, and it can be seen that the MD20S-containing mortar had fewer defects than other mortars.

Example 4

Improvement of Flow and Self-Leveling, De-Aeration Rate and Surface Appearance of an Aluminosilicate PCE-Based SLU Drymix Mortar Containing a Wetting Agent at Reduced Use Level of Powdered Surfactant Table 4 shows self-leveling drymix mortar tests using the powdered surfactants of the present invention in comparison with two conventional powdered surfactants in a PCE-based SLU drymix mortar. All of the formulations in the table also included SURFYNOL® 104S, which was used at 0.1 wt % in all of the formulations to improve wetting (except for Control 2, where the level was 0.25%).

from 3.39 defects/cm² to 0.17 defects/cm². At standard use level of 0.1 wt % powdered surfactant to mortar drymix weight, the surface defect density was reduced by about 75%, i.e., from 1.53 defects/cm² (for conventional powdered surfactants) to 0.39 defects/cm² (for the powdered surfactants of the invention). At a use level of 0.05 wt %, which represents a threefold decrease compared with conventional use levels, the surface defect density was reduced by 94% and 77%; i.e., from a value of 2.76 defects/cm² or more (conventional powdered surfactant SILIPUR RE 2971) to 0.17 and 0.63 defects/cm² for the inventive powdered surfactants MD20S and D604S, respectively.

At a standard use level of 0.15 wt %, the self-leveling outflow at 10 minutes was significantly improved (by 2.0 cm and 0.7 cm) for D604S and MD20S, respectively, compared with a conventional powdered surfactant (SILIPUR RE 2971).

TABLE 4

| | | Flow test | Self-leveling test | | | | De-aeration kinetics | | | |
| | | Outflow | Outflow | Outflow | Inflow | Open time | mortar dry | Air content | | Surface defects |
| Powdered surfactant | Use level [wt %/drymix] | 13 min [cm] | 2 min [cm] | 10 min [cm] | 12 min [cm] | OT [min] | density [g/cm³] | 5 min [vol %] | 13 min [vol %] | density [defects/cm²] |
|---|---|---|---|---|---|---|---|---|---|---|
| None (Control 1) | — | 20.6 | 13.7 | 13.3 | 6.7 | 11:30 | 1.847 | 4.80 | 3.70 | 3.3862 |
| None (Control 2) | — | 20.6 | 13.7 | 13.3 | 6.7 | 11:30 | 1.847 | 4.80 | 3.70 | 3.3855 |
| Silipur RE 2971 | 0.15 | 21.1 | 14.5 | 13.9 | 9.8 | 11:30 | 1.837 | 1.35 | 1.45 | 1.35 |
| | 0.10 | 21.2 | 14.5 | 13.8 | 8.8 | 12:00 | 1.776 | 1.15 | 1.25 | 1.53 |
| | 0.075 | 21.3 | 14.9 | 14.3 | 9.0 | 12:00 | 1.967 | 1.55 | 1.30 | 2.10 |
| | 0.05 | 21.3 | 14.8 | 14.1 | 8.9 | 11:30 | 2.011 | 1.90 | 1.90 | 2.76 |
| | 0.025 | 21.1 | 14.3 | 13.9 | 8.8 | 11:30 | 1.874 | 2.15 | 2.10 | 2.89 |
| MD20S | 0.15 | 22.0 | 15.2 | 14.6 | 9.5 | 11:30 | 1.913 | 1.35 | 1.15 | 0.44 |
| | 0.10 | 21.8 | 15.2 | 14.5 | 8.8 | 11:30 | 2.003 | 1.20 | 0.95 | 0.39 |
| | 0.075 | 21.7 | 15.7 | 15.0 | 9.7 | 12:00 | 2.013 | 1.10 | 1.10 | 0.25 |
| | 0.05 | 21.7 | 15.6 | 14.7 | 9.5 | 12:00 | 2.019 | 1.20 | 1.05 | 0.17 |
| | 0.025 | 21.7 | 15.2 | 14.2 | 7.5 | 12:30 | 1.978 | 1.15 | 1.20 | 0.60 |
| D604S | 0.15 | 22.6 | 15.8 | 15.3 | 9.2 | 11:30 | 1.941 | 1.40 | 1.30 | 0.63 |
| | 0.10 | 22.5 | 15.2 | 14.7 | 9.5 | 11:30 | 1.908 | 1.25 | 1.35 | 0.41 |
| | 0.075 | 22.2 | 15.2 | 14.7 | 9.3 | 11:30 | 1.972 | 1.30 | 1.35 | 0.64 |
| | 0.05 | 22.1 | 15.2 | 14.7 | 9.4 | 12:00 | 1.946 | 1.85 | 1.45 | 0.63 |
| | 0.025 | 21.8 | 15.1 | 14.7 | 9.5 | 12:30 | 1.875 | 2.15 | 1.75 | 0.64 |

Reduced mortar air content was achieved by the inventive powdered surfactants. At a standard use level of 0.1 wt % powdered surfactant to mortar drymix weight, the powdered surfactants of the invention reduced the air content to 0.95 vol %, compared with 1.2 vol % for conventional powdered surfactants in the presence of wetting agent in the drymix mortar composition. In the absence of wetting agent in the drymix mortar composition, the powdered surfactants of the invention reduced the air content to 1.0-1.5 vol %, compared with from 1.1-1.6 for conventional powdered surfactants.

As can be seen in Table 4, the powdered surfactants of the present invention (MD20S and D604S) provided enhanced performance at reduced use levels, even below a 0.15 wt % loading level, in the drymix mortar system of Example 2. In fact, from Table 4, it can be seen that the powdered surfactants of the present invention had an outflow 0.4 cm to 0.8 cm higher than SILIPUR RE 2971 at only ⅓ of the 0.15 wt % recommended use level for SILIPUR, and still provided excellent de-aeration of 1.05 vol % while still maintaining good open time. They also provided a highly durable mortar (as indicated by a density above 2 g/cm³) with improved surface appearance, with a surface defect density reduced Even at a reduced use level, powdered surfactants according to the invention outperformed conventional powdered surfactants at typically used levels (i.e., much higher levels) in flow test outflow performance. For example, at 0.025 wt % to drymix weight, D604S and MD20S gave outflows of 21.8 and 21.7 cm respectively, vs. only 21.1 for SILIPUR RE 2971 at a much higher use level (0.15 wt %).

Example 5

Improvement of Long Term Stability and Flow & Self-Leveling of a PCE-Based Portland SLU Drymix Mortar without a Wetting Agent Table 5 shows a comparison of the long term stability, relative to flow and leveling, of high durability Portland PCE-based drymix mortars for self-leveling underlayment using the powdered surfactants of the present invention, in comparison with two conventional powdered surfactants (S104S and an alkoxylated fatty alcohol). The S104S, MD20S, and D604S all used HISIL 233 as the carrier, and a 0.1 wt % loading level of the powdered surfactant was used in each drymix. The runs in Table 5 did not include any other surfactants.

TABLE 5

| Powdered Surfactant | Outflow | | | Inflow | | | Self Leveling | Storage |
| --- | --- | --- | --- | --- | --- | --- | --- | --- |
| | $A_{[cm]}$ 7 min | $C_{[cm]}$ 8 min | $E_{[cm]}$ 12 min | $B_{[cm]}$ 18 min | $D_{[cm]}$ 18 min | $avg_{[cm]}$ 18 min | $\Delta I$ [cm] 18 min | days/° C. |
| None (Blank) | 11.1 | 10.9 | 10.8 | 6.9 | 6.0 | 6.5 | 0.9 | 0/23 |
| Alkoxylated fatty alcohol | 11.4 | 11.5 | 11.6 | 7.9 | 7.3 | 7.6 | 0.6 | 0/23 |
| S104S | 11.4 | 11.5 | 11.6 | 8.2 | 7.1 | 7.7 | 1.1 | 0/23 |
| MD20S batch 1 | 12.5 | 12.9 | 13.0 | 9.9 | 8.6 | 9.3 | 1.3 | 0/23 |
| MD20S batch 2 | 12.6 | 12.5 | 12.9 | 9.1 | 9.1 | 9.1 | 0.0 | 0/23 |
| D604S batch 1 | 12.3 | 12.4 | 12.5 | 8.8 | 8.4 | 8.6 | 0.4 | 0/23 |
| None (Blank) | 11.2 | 11.1 | 11.2 | 7.1 | 7.3 | 7.2 | 0.2 | 7/40 |
| Alkoxylated fatty alcohol | 11.4 | 11.6 | 11.6 | 7.1 | 6.1 | 6.6 | 1.0 | 7/40 |
| S104S | 11.4 | 11.4 | 11.5 | 7.4 | 7.0 | 7.2 | 0.4 | 7/40 |
| MD20S batch 1 | 12.5 | 12.5 | 12.9 | 9.0 | 9.7 | 9.4 | 0.7 | 7/40 |
| MD20S batch 2 | 12.4 | 12.4 | 12.6 | 8.5 | 8.9 | 8.7 | 0.4 | 7/40 |
| D604S batch 1 | 12.2 | 12.2 | 12.3 | 7.8 | 8.8 | 8.3 | 1.0 | 7/40 |
| None (Blank) | 11.0 | 10.9 | 10.9 | 6.5 | 6.0 | 6.3 | 0.5 | 28/40 |
| Alkoxylated fatty alcohol | 10.7 | 10.7 | 10.7 | 5.4 | 5.7 | 5.6 | 0.3 | 28/40 |
| S104S | 11.4 | 11.4 | 11.3 | 7.2 | 7.0 | 7.1 | 0.2 | 28/40 |
| MD20S batch 1 | 11.7 | 12.0 | 12.2 | 8.0 | 8.2 | 8.1 | 0.2 | 28/40 |
| MD20S batch 2 | 12.0 | 12.1 | 12.3 | 7.5 | 8.4 | 8.0 | 0.9 | 28/40 |
| D604S batch 1 | 12.3 | 12.5 | 12.5 | 8.8 | 8.3 | 8.6 | 0.5 | 28/40 |

Batch 1 of MD20S was a 1000-gram laboratory batch, and Batch 2 was a 25 kg pilot scale batch. As can be seen, similar results were obtained despite the difference in scale of the preparations.

As can be seen in the table, powdered surfactants according to the invention showed improved outflow and inflow, excellent self-leveling, and high performance stability upon long term storage (28 days) at ambient (23° C.) and high (40° C.) temperature. For instance, after 28 days storage at 40° C., D604S provided an outflow increase of 1.8 cm and an average inflow increase of 3.0 cm compared with an alkoxylated fatty alcohol, and an outflow increase of 1.2 cm and inflow increase of 1.5 cm in comparison with S104S. This enhancement of flow is consistent with a better long term stability at 40° C. than seen with the conventional powdered surfactants.

Example 6

Improvement of Flow and Self-Leveling, Open Time, De-Aeration Rate, Dry Mortar Density and Surface Appearance of a PCE-Based Portland SLU Drymix Mortar at Low Powdered Surfactant Use Levels Table 6 shows compares the results of using two powdered surfactants according to the invention (MD20S and D604S) against one conventional powdered surfactant (S104S) with regard to key application properties of a SLU Portland drymix mortar including a PCE superplasticizer. All of the powdered surfactants used HISIL® 233 as the carrier. The runs in Table 6 did not include any other surfactants.

TABLE 6

| Powdered surfactant | Use level [wt %] | Outflow [cm] [13 min] | Open time [min] | De-aeration kinetics Air content [vol %] | | Dry mortar density [g/cm³] | Surface defects density [defects/cm²] |
| --- | --- | --- | --- | --- | --- | --- | --- |
| | | | | 5 min | 13 min | | |
| S104S | 0.2 | 23.90 | 19.50 | 1.50 | 1.30 | 1.554 | 1.598 |
| S104S | 0.1 | 23.83 | 20.50 | 1.40 | 1.50 | 1.945 | 1.197 |
| S104S | 0.05 | 23.53 | 20.50 | 1.30 | 1.20 | 1.999 | 0.976 |
| S104S | 0.025 | 23.43 | 18.50 | 1.40 | 1.15 | 2.023 | 0.863 |
| MD20S | 0.2 | 25.20 | 24.00 | 1.50 | 1.05 | 2.117 | 0.205 |
| MD20S | 0.1 | 25.00 | 23.50 | 1.10 | 0.95 | 2.120 | 0.197 |
| MD20S | 0.05 | 24.85 | 23.00 | 1.05 | 0.80 | 2.127 | 0.108 |
| MD20S | 0.025 | 24.80 | 18.00 | 0.95 | 0.75 | 2.133 | 0.048 |
| D604S | 0.2 | 24.60 | 21.50 | 1.20 | 1.25 | 1.648 | 1.556 |
| D604S | 0.1 | 24.43 | 21.50 | 1.15 | 1.20 | 1.875 | 0.675 |
| D604S | 0.05 | 24.30 | 21.50 | 1.10 | 1.10 | 2.009 | 0.323 |
| D604S | 0.025 | 23.87 | 21.00 | 1.00 | 1.10 | 2.075 | 0.191 |

As can be seen in Table 6, the powdered surfactants of the invention provided enhanced flow and self-leveling, and superior open time. They also provided long-lasting de-aeration effectiveness, as indicated by the fact that they were able to continue de-aerating for at least 13 minutes after completion of mixing, which corresponds to the open time of the SLU drymix mortar without powdered surfactant. This can be seen most clearly at reduced use levels, e.g. at 0.025 wt %, where improved surface appearance was obtained compared with equal amounts of the conventional powdered surfactant S104S, while still maintaining good de-aeration kinetics and outflow values.

Table 7 shows a comparison of the dependence of key application properties of a SLU drymix mortar on the use level of powdered surfactants of the invention, compared with conventional powdered surfactants. None of the runs in Table 7 included any additional surfactant.

formance when used at relatively low use levels (0.03-0.075 wt %) similar to those obtained using higher loadings (0.10 wt-0.20 wt %) of conventional powdered surfactants. Typically, use of the inventive powdered surfactants at these lower levels also provides open time that is as good as or better than that resulting from use of conventional powdered surfactants at the more standard (i.e., higher) 0.1 wt % level. In addition, even at low use levels, the inventive powdered surfactants provide mortar air content in some cases as much as 55% lower (e.g., from 1.9 vol % for FOAMASTER to 1.0 vol % for D604S at 5 minutes at a 0.03% loading; see Table 7) for formulations without any additional surfactants. Thus, improvements are seen in several properties simultaneously.

Although the invention is illustrated and described herein with reference to specific embodiments, it is not intended that the subjoined claims be limited to the details shown. Rather, it is expected that various modifications may be made in these

TABLE 7

| | | Flow test | Self-leveling test | | | | | | | De-aeration | | |
|---|---|---|---|---|---|---|---|---|---|---|---|---|
| | Use | Outflow | Outflow | | | Inflow | | | Self- | Open | Air Content | Surface |
| Powdered | level | [cm] | A [cm] | C [cm] | E [cm] | B | D | avg | Leveling | time | [vol %] | Ap- |
| Surfactant | [wt %] | 13 min | 7 min | 8 min | 12 min | [cm] | [cm] | [cm] | ΔI [cm] | [min] | 5 min | 13 min | pearance |
| No Add | 0 | 21.2 | 11.1 | 10.9 | 10.8 | 6.9 | 6.0 | 6.5 | 0.9 | 13.0 | 1.5 | 1.5 | 4 |
| Rhoximat 770DD | 0.03 | 24.0 | 11.5 | 11.7 | 11.5 | 8.0 | 8.0 | 8.0 | 0.0 | 19.5 | 1.1 | 1.3 | 1.5 |
| Rhoximat 770DD | 0.1 | 23.8 | 11.9 | 11.9 | 12.0 | 8.1 | 7.8 | 8.0 | 0.3 | 20.5 | 1.0 | 1.1 | 2 |
| Silipur RE 2971 | 0.03 | 24.0 | 11.4 | 11.2 | 11.3 | 8.0 | 6.8 | 7.4 | 1.2 | 20.5 | 1.4 | 1.2 | 3.5 |
| Silipur RE 2971 | 0.1 | 24.0 | 11.4 | 11.6 | 11.4 | 7.2 | 7.0 | 7.1 | 0.2 | 20.5 | 1.2 | 1.2 | 3.5 |
| S104S | 0.03 | 23.4 | 11.7 | 11.4 | 11.4 | 7.5 | 7.3 | 7.4 | 0.2 | 18.5 | 1.4 | 1.1 | 2.5 |
| S104S | 0.1 | 23.8 | 11.4 | 11.7 | 11.7 | 7.3 | 7.9 | 7.6 | 0.6 | 20.5 | 1.4 | 1.6 | 2 |
| Agitan P803 | 0.03 | 23.6 | 11.1 | 11.5 | 11.4 | 7.3 | 7.3 | 7.3 | 0.0 | 20.5 | 1.1 | 1.1 | 1 |
| Agitan P803 | 0.1 | 23.9 | 11.5 | 11.5 | 11.5 | 7.4 | 7.5 | 7.5 | 0.1 | 19.5 | 1.4 | 1.3 | 1 |
| Agitan P804 | 0.03 | 23.9 | 11.4 | 11.5 | 11.3 | 7.7 | 6.3 | 7.0 | 1.4 | 19.5 | 1.1 | 1.4 | 1 |
| Agitan P804 | 0.1 | 23.8 | 11.5 | 11.5 | 11.5 | 7.9 | 7.1 | 7.5 | 0.8 | 21.5 | 1.1 | 1.3 | 1.5 |
| Agitan P823 | 0.03 | 23.7 | 11.3 | 11.3 | 11.3 | 6.6 | 7.0 | 6.8 | 0.4 | 19.5 | 1.2 | 1.1 | 1 |
| Agitan P823 | 0.1 | 23.4 | 11.5 | 11.6 | 11.6 | 7.1 | 7.4 | 7.3 | 0.3 | 21.5 | 1.3 | 1.1 | 2 |
| DC 2-4248S | 0.03 | 24.1 | 11.5 | 11.4 | 11.4 | 7.1 | 6.6 | 6.9 | 0.5 | 19.5 | 1.3 | 1.3 | 3 |
| DC 2-4248S | 0.1 | 23.9 | 11.8 | 11.7 | 11.8 | 8.2 | 7.8 | 8.0 | 0.4 | 20.5 | 1.4 | 1.4 | 2.5 |
| Foamaster PD 01 | 0.03 | 23.9 | 11.6 | 11.7 | 11.9 | 7.7 | 8.5 | 8.1 | 0.8 | 21.5 | 1.9 | 1.4 | 3 |
| Foamaster PD 01 | 0.1 | 24.2 | 11.7 | 11.7 | 11.8 | 7.5 | 9.0 | 8.3 | 1.5 | 23.5 | 1.5 | 1.35 | 2.5 |
| D604S | 0.03 | 23.9 | 11.7 | 11.7 | 12.1 | 8.2 | 8.2 | 8.2 | 0.0 | 21.5 | 1.0 | 1.1 | 4 |
| D604S | 0.1 | 24.4 | 12.2 | 12.2 | 12.5 | 8.5 | 7.9 | 8.2 | 0.6 | 21.5 | 1.0 | 1.2 | 3.5 |
| MD20S | 0.03 | 24.8 | 12.0 | 11.9 | 12.2 | 8.1 | 8.3 | 8.2 | 0.2 | 18.5 | 1.1 | 1.2 | 4 |
| MD20S | 0.1 | 25.0 | 12.1 | 12.2 | 12.4 | 8.1 | 8.3 | 8.2 | 0.2 | 25.2 | 1.4 | 1.5 | 4 |

As can be seen in Table 7, at a use level of 0.03 wt % the powdered surfactants of the present invention provided simultaneously a high mortar spreadability (Flow Test Outflow >23.9 cm), enhanced inflow (>8.1 cm) and self-leveling ΔI of maximum 0.2 cm, and a high surface quality (4 on scale 1-5, 5 being excellent), while maintaining a low air content (1.2 vol % after 13 min) in a freshly prepared SLU drymix mortar. This combination of properties was not matched by the conventional powdered surfactants shown above.

Simultaneous enhancement of the self-leveling behaviour (ΔI) and inflow was provided by the inventive powdered surfactants. Conversely, even at a higher use level (the standard 0.1 wt %), conventional powdered surfactants did not offer simultaneously excellent self-leveling and inflow for a drymix mortar.

Powdered surfactants of the invention also provided longer open times. At a standard use level of 0.1 wt % powdered surfactant to mortar drymix weight, the freshly prepared drymix mortar had an open time as long as 25.2 minutes, compared with a maximum of 23.5 for the best conventional powdered surfactant (FOAMASTER PD 01) shown in Table 7, along with significantly better surface appearance.

In general, the inventors have found that the powdered surfactants of this invention achieve outflow and inflow per-details by those skilled in the art, which modifications may still be within the spirit and scope of the claimed subject matter and it is intended that these claims be construed accordingly.

The invention claimed is:

1. A composition comprising particles of a carrier having on a surface thereof a compound according to structure (A)

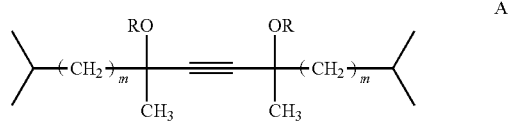

; wherein either m is 1 and R is according to structure (B)

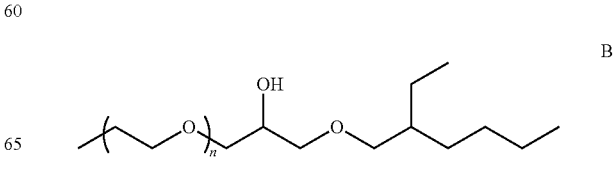

in which n is an integer from 3 to 7, or m is 2 and R is according to structure (C)

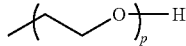
C in which p is an integer from 1 to 10; and
wherein the carrier comprises silica and has a specific surface area of at least 50 m²/g.

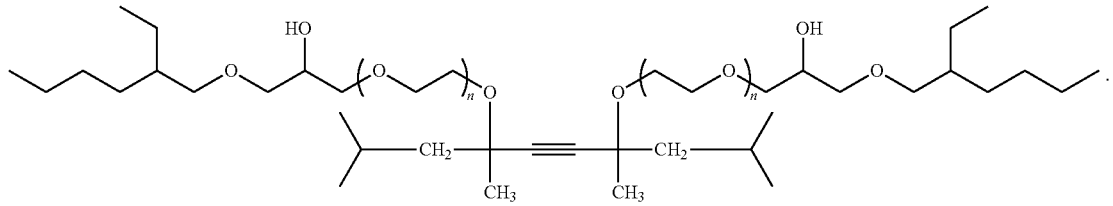

2. The composition of claim 1, wherein the carrier has an average particle size D(1,0.5) of from 5 μm to 100 μm.

3. The composition of claim 1, wherein the compound according to structure (A) constitutes in a range of 10 to 75 wt % of the particles.

4. The composition of claim 1, wherein m is 2 and R is according to structure (C).

5. The composition of claim 1, wherein m is 1 and R is according to structure (B).

6. The composition of claim 1, further comprising a particulate cementitious component.

7. The composition of claim 6, wherein m is 2 and R is according to structure (C).

8. The composition of claim 1, wherein the carrier further comprises a zeolite.

9. The composition of claim 6, wherein the cementitious component comprises a component selected from the group consisting of calcium phosphate, calcium carbonate, kaolin, chalk, microtalcum, barium sulfate, zinc oxide, aluminium oxide, and titanium dioxide.

10. The composition of claim 9, wherein the cement composition is a dry composition.

11. The composition of claim 9, wherein the cement composition further comprises a superplasticizer.

12. The composition of claim 11, wherein the superplasticizer comprises a sulfo-modified melamine-formaldehyde condensate, a polycarboxylate ether, or a combination of these.

13. The composition of claim 6, wherein the cementitious component comprises Portland cement.

14. The composition of claim 6, wherein the cement composition further comprises a superplasticizer.

15. The composition of claim 6, wherein m is 1 and R is according to structure (B).

16. The composition of claim 15, wherein the cementitious component comprises an aluminosilicate.

17. The composition of claim 16, wherein the cement composition further comprises a superplasticizer.

18. A method of making a cement mixture, the method comprising combining water, a particulate cementitious component, and a composition according to claim 1.

19. The composition of claim 1 wherein m is 2 and R is according to a structure C:

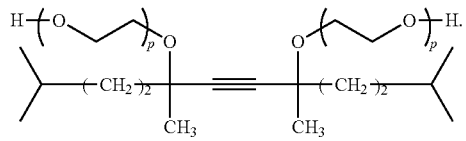

20. The composition of claim 1 wherein m is 1 and R is according to a structure (B):

21. The composition of claim 1 further comprising at least one member selected from the group consisting of wetting agents, flow and leveling agents, shrinkage reducing agents, and water reducing agents.

22. The composition of claim 1 further comprising at least one member selected from the group consisting of naphthalene sulfonates, polystyrene sulfonates, phosphates, phosphonates, cross-linked homo- or co-polymers of acrylic acid and salts thereof, calcium-salts of organic acids having 1 to 4 carbon atoms, salts of alkanoic acids, aluminum sulfate, metallic aluminum, bentonite, montmorillonite, sepiolite, polyamide fibers, polypropylene fibers, polyvinyl alcohol, and homo-, co-, or terpolymers based on vinyl acetate, maleic ester, ethylene, styrene, butadiene, vinyl versatate, and acrylic monomers.

23. The composition of claim 1 further comprising at least one of air entraining agents and de-aerating agents.

24. The composition of claim 1 further comprising at least one redispersible dispersion powder selected from the group consisting of polyvinyl acetate, polyethylene-polyvinyl acetate, polyvinyl alcohol, and homo-, co-, or terpolymers based on vinyl acetate, maleic esters, ethylene, styrene, butadiene, vinyl versatate, and acrylic monomers.

25. The composition of claim 1 further comprising fibers comprising at least one member selected from the group consisting of steel, glass, carbon, polyolefins, polyester, and polyamide fibers.

26. The composition of claim 1 further comprising at least one rheology modifier selected from the group consisting of cellulose containing and polysaccharide additives, starch, biopolymers, xanthan gum, alkali swellable acrylic associative thickeners, sands, and clays.

27. The composition of claim 1 further comprising at least one member selected from the group consisting of inorganic cement components, gypsum, blast furnace slag, fly ash, aluminum sulfate, metallic aluminum, bentonite, montmorillonite, sepiolite, dyes, pigments and micronized coloring agents.

28. The composition of claim 1 further comprising at least one member selected from the group consisting of set accelerators, set retarders, water repellents, hydrophobizing agents, corrosion inhibitors, flame retardants, biocides and fungicides.

* * * * *